UNITED STATES PATENT OFFICE.

WHEELER P. DAVEY, OF SCHENECTADY, NEW YORK, ASSIGNOR TO GENERAL ELECTRIC COMPANY, A CORPORATION OF NEW YORK.

NON-INFLAMMABLE JAPAN AND PROCESS OF MAKING SAME.

1,294,422.     Specification of Letters Patent.     Patented Feb. 18, 1919.

No Drawing.     Application filed November 14, 1917. Serial No. 201,900.

*To all whom it may concern:*

Be it known that I, WHEELER P. DAVEY, a citizen of the United States, residing at Schenectady, in the county of Schenectady, State of New York, have invented certain new and useful Improvements in Non-Inflammable Japan and Processes of Making the Same, (continuation in part of my application filed August 18, 1917, Serial No. 186,965,) of which the following is a specification.

The present invention comprises a process of applying an organic material, such for example, as japan without the risk attending the use of an inflammable solvent. A japan ordinarily consists of an asphaltic or pitchy material combined with oleaginous material, such as linseed oil, china wood oil, fish oil, or of a polymerization, condensation, or oxidation product obtained from any one of these materials, or mixtures of them. Sometimes a coloring matter such as bone-black or lamp-black, and frequently an ordinary hydrocarbon oil is also present.

In accordance with my invention, the japan or other oleaginous material is emulsified in water by suitable amounts of an alkali material, preferably ammonia, and the resulting emulsion, diluted if necessary, is applied upon the objects to be coated, preferably by cataphoresis, and the coating finally is hardened by baking.

In order to carry out my invention, the japan in the presence of a suitable amount of water and a small amount of ammonia, or other suitable alkali, such as sodium or potassium hydroxid, is heated in an inclosed space, the mixture being preferably stirred to produce uniformity by both heating and admixture until the emulsion is produced. For example, when working with a japan consisting of asphalt, thickened or polymerized fish oil, china wood oil, copal, and a drier such as manganese resinate, about 8 parts by volume of the japan are mixed with 30 parts by volume of water, and 3 parts by volume of ammonia solution, sp. gr. .90 and heated in a closed receptacle. The heating is carried out while stirring at slow speed at a temperature above the softening point of the japan base, for example, 70° to 125° C. until a uniform emulsion has been produced. The emulsion consists of small droplets of japan, each surrounded by a film of soap produced by the saponification of some of the oil in the japan by the ammonia, or other alkaline material.

In some cases it is preferable to mix the japan with the desired amount of alkali, say, ammonia, in a concentrated state, then to heat to the softening point of the japan, or to a higher temperature and to dilute with water progressively until the desired consistency is attained. By the described method of producing the emulsion, access of carbon dioxid and oxygen of the atmosphere is substantially eliminated. Agitation of the mixture by blowing in air as heretofore practised in emulsifying processes produces undesired oxidation and also the formation of scum by the action of the carbon dioxid contained in air. By the statement that the emulsification is carried out in an inclosed space I mean that a circulation of the atmosphere through the material to be emulsified is to be avoided and access of air prevented as far as practicable. Some little air, of course, may be in contact with the mixture but will do relatively little harm unless constantly changed. It may even be desirable to have an opening communicating with the emulsifying tank connected to a reflux condenser.

The metallic objects to be coated are suspended as an anode in this emulsion, using a cathode of any suitable conducting material, such as tin or iron. A metallic container conveniently may be used as cathode. The voltage required depends upon the character of the japan, voltages of 10 to 250 volts having been used. In some cases the japan may be applied by dipping the object to be coated within the emulsion or painting the emulsion on the object. It is desirable to maintain the emulsion below about 20° C., say at 15° C. to prevent the formation of a surface scum, by the action of the carbon dioxid of the air.

The object on which a coat of japan has been caused to adhere electrically or mechanically is preferably dried to remove a superficial film of moisture but this drying treatment is not absolutely essential. In order to set the japan the coated article is baked. The baking temperature will vary with the character of the japan, but it will ordinarily be within limits of about 100 to 260° C. The resulting japan coating has about the same properties, such as hardness and adherence, as when applied with an ordinary hydrocarbon solvent. Baking incidentally decomposes the compound of oil and ammonia and drives off ammonia. In cases where sodium or potassium hydroxid are used the alkali is not driven off but if present in only small amounts it does little harm by remaining incorporated within the body of the hardened japan.

By the above emulsifying process japans may be made from mixtures of materials which if treated with an ordinary solvent would be incompatible. For example, certain asphaltic and resinous substances tend to jellify in the presence of each other when treated with hydrocarbon solvent in the ordinary way. Components otherwise incompatible may be emulsified separately and then mixed. In fact, two substances mixed in this way need not both be fluid. One may be a solid, and when finally divided the particles will adhere to the droplets or will be held in suspension by the soap or oil, or may even be dissolved in the oil.

In some cases it is desirable to coat an object either mechanically or by cataphoresis, first with one kind of japan emulsion, chosen more particularly for its adhering properties and then to apply a second coat, preferably by cataphoresis of japan emulsion which has more desirable surface properties, such as color and luster.

What I claim as new and desire to secure by Letters Patent of the United States, is:—

1. The process of making a japan which consists in separately emulsifying the component parts of said japan in an alkaline aqueous solution and then mixing said emulsions.

2. The process of making an emulsion which consists in heating an oleaginous material, water and an alkali in contact with each other, and preventing the access of gases having a chemical effect on the ingredients until said material has been emulsified.

3. The process of making an emulsion which consists in heating oleaginous material, water and an alkaline material in an inclosed space, thereby preventing access of oxygen and carbon dioxid, and stirring said mixture until emulsified.

4. The process of making an emulsion of japan which consists in heating japan-forming material, comprising an asphaltic material and an oil in contact with water and an alkaline material to a temperature above the softening point of the japan forming material, and stirring the mixture while preventing access of air.

5. The process of making an emulsion of japan which consists in heating japan forming oleaginous material and concentrated alkali to the softening point of the japan forming material, diluting with water until a desired consistency is obtained, and mechanically stirring the mixture while preventing access of air until a uniform emulsion of the oleaginous material has been produced.

6. A japan for coating objects which comprises an emulsion in water of japan-forming oleaginous materials and an alkali, adapted to be applied to objects in thin layers and convertible by baking to a hard, adherent coating.

7. A japan which comprises an emulsion of saponifiable oil, asphaltic material and ammonia in water, substantially free from scum, adapted to be applied to objects mechanically or by cataphoresis and convertible by subsequent heat to a hard, adherent coating.

8. A japan comprising an emulsion in water of asphalt, a saponifiable oil, copal and ammonia, adapted to be dried and hardened by heating.

In witness whereof, I have hereunto set my hand this 12th day of November 1917.

WHEELER P. DAVEY.